(12) United States Patent
Ha et al.

(10) Patent No.: US 8,195,248 B2
(45) Date of Patent: Jun. 5, 2012

(54) DISGUISED POWER-OFF METHOD FOR A MOBILE COMMUNICATION TERMINAL

(75) Inventors: Dohoon Ha, Seoul (KR); Sangwoon Kwon, Seongnam-si (KR); Jaeyoung Ju, Gunpo-si (KR)

(73) Assignee: SK Telecom Co., Ltd., Seoul (KR)

( * ) Notice: Subject to any disclaimer, the term of this patent is extended or adjusted under 35 U.S.C. 154(b) by 1092 days.

(21) Appl. No.: 11/629,652

(22) PCT Filed: Jun. 29, 2005

(86) PCT No.: PCT/KR2005/002047
§ 371 (c)(1),
(2), (4) Date: Dec. 15, 2006

(87) PCT Pub. No.: WO2006/001684
PCT Pub. Date: Jan. 5, 2006

(65) Prior Publication Data
US 2008/0051101 A1 Feb. 28, 2008

(30) Foreign Application Priority Data

Jun. 29, 2004 (KR) .................. 10-2004-0049625
Jul. 14, 2004 (KR) .................. 10-2004-0054919

(51) Int. Cl.
*H04B 1/38* (2006.01)
*H04M 1/00* (2006.01)

(52) U.S. Cl. ............... 455/574; 455/418; 455/456.2; 455/404.2

(58) Field of Classification Search .............. None
See application file for complete search history.

(56) References Cited

U.S. PATENT DOCUMENTS 6,487,425 B1 * 11/2002 Thakker et al. ............... 455/574
6,775,554 B1 * 8/2004 Sugitani ....................... 455/463
(Continued)

FOREIGN PATENT DOCUMENTS

JP 2002-335566 A1 11/2002
(Continued)

*Primary Examiner* — Rafael Pérez-Gutiérrez
*Assistant Examiner* — Frank Donado
(74) *Attorney, Agent, or Firm* — Lowe Hauptman Ham & Berner, LLP

(57) ABSTRACT

The present invention relates to a method of determining the location of a mobile terminal using disguised power-off, wherein if a mobile terminal is powered off in a state where a mobile communication service subscriber does not intend to do so, only the location indication function of the mobile terminal operates, but the remaining functions are terminated as if power of the mobile terminal is turned off. In accordance with the present invention, it is determined whether the subscriber terminal is actually powered off or powered off in a disguised manner. All the power of the subscriber terminal is shut off, or all the power except for power for a function of sending a location signal is shut off, depending on the type of power-off. Furthermore, when a location request signal is received from the server of a mobile communication service provider after the subscriber terminal has been powered off in a disguised manner, the subscriber terminal sends a location signal to a call originator that corresponds to call originator information stored therein. The present invention is advantageous in that, when a mobile terminal is powered off by a disguised power-off key when a user, such as a child or teenager, is in danger, the location of the mobile terminal can be determined through locating thereof.

9 Claims, 3 Drawing Sheets

U.S. PATENT DOCUMENTS

| | | | |
|---|---|---|---|
| 7,236,799 B2 * | 6/2007 | Wilson et al. | 455/456.3 |
| 7,272,382 B2 * | 9/2007 | Servi et al. | 455/411 |
| 2002/0156646 A1 * | 10/2002 | Kaiwa et al. | 705/1 |
| 2003/0087679 A1 * | 5/2003 | Naka et al. | 455/574 |
| 2004/0204123 A1 * | 10/2004 | Cowsky et al. | 455/565 |
| 2005/0197138 A1 * | 9/2005 | Kaminsky et al. | 455/456.1 |

FOREIGN PATENT DOCUMENTS

| | | |
|---|---|---|
| JP | 2003-218767 A1 | 7/2003 |
| KR | 1999-59011 A1 | 7/1999 |
| KR | 2002-018255 A1 | 3/2002 |
| KR | 2005-1157 A1 | 1/2005 |

\* cited by examiner

DISGUISED POWER-OFF METHOD FOR A MOBILE COMMUNICATION TERMINAL

CROSS REFERENCE TO RELATED APPLICATION

This application is the National Phase application of International Application No. PCT/KR2005/002047, filed 29 Jun. 2005, which designates the United States and was published in English. This application, in its entirety, is incorporated herein by reference.

TECHNICAL FIELD

The present invention relates to a disguised power-off method for a mobile terminal and, more particularly, to a disguised power-off method for a mobile terminal wherein, if a mobile terminal is powered off in the case where a mobile communication service subscriber does not intend to do so, only the location indication function of the mobile terminal operates and the remaining functions are terminated as if the mobile terminal is powered off.

BACKGROUND ART

Generally, subscribers to mobile communication service turn on or off mobile terminals when needed.

When the power of a mobile terminal is turned on, power is applied to the mobile terminal, and the powered mobile terminal requests the communication service registration of the mobile terminal from the server of a mobile communication service provider while communicating with an adjacent base station. The mobile terminal whose communication service has been registered can be provided with communication service, such as an outgoing call connection or incoming call connection service, and multimedia data service, such as Short Message Service (SMS) and Internet service, as necessity requires.

Furthermore, the mobile terminal can register its current location with the server of the mobile communication service provider through communication with a base station. Alternately, the location of the mobile terminal can be tracked using a Global Positioning System (GPS).

FIG. 1 is a conceptual view illustrating the power-on/off process of a common mobile terminal. In FIG. 1, a subscriber terminal 100 that has subscribed to communication service is connected to a server 200 of the mobile communication service provider and a patron terminal 300 via a wireless communication network. The subscriber terminal 100 detects a call connection through the subscriber terminal 100 or the patron terminal 300, and is provided with communication service.

The subscriber terminal 100 and the patron terminal 300 are mobile phones. Although not shown in the drawing, they each include a transmission/reception means for performing wireless communication, a control means for performing the overall control of the mobile phone, a display means for displaying the operation and status of the mobile phone, a voice Input/Output (I/O) means, and a key input means for inputting character data.

Meanwhile, if power-off manipulation is detected through the key input means, the subscriber terminal 100 is powered off. However, before being powered off, the subscriber terminal 100 requests the release of the communication service connection by sending a power-off signal to the server 200 of the mobile communication service provider. After the communication service connection of the subscriber terminal 100 has been released, all the functions of the mobile terminal 100, including an incoming connection function, an outgoing connection and the other functions, are terminated. The server 200 of the mobile communication service provider stores information about the subscriber terminal 100 whose communication service connection has been released in a database. Thereafter, when a call connection to the subscriber terminal 100 whose communication service connection has been released is detected, the server 200 of the mobile communication service provider sends a message indicating that communication is impossible due to power-off to the terminal 300 on a calling side.

If the battery is forcibly removed, or the terminal is forcibly powered off using a power key regardless of a user's intention, a problem arises in that all the functions of the subscriber terminal 100 are stopped and, accordingly, information about the location of the terminal cannot be ascertained.

In other words, in the case where a subscriber loses his or her terminal, if the person who picks up the lost subscriber terminal 100 forcibly removes the battery from the terminal or forcibly turns off the terminal using the power key, a problem arises in that the lost mobile terminal cannot be found.

Furthermore, in the case where the mobile terminal is powered off through the power key when a child or a teenager is in danger, a problem arises in that the location of the mobile terminal cannot be tracked using the mobile terminal.

Therefore, the present invention proposes a disguised power-off method for a mobile terminal, in which, when the mobile terminal is powered off against a user's desire, the mobile terminal outputs a signal through which the location of the mobile terminal can be determined and operates as if it is powered off.

DISCLOSURE

Technical Problem

In order to solve the above-described problem, an object of the present invention is to provide a disguised power-off method for a mobile terminal, wherein, when the mobile terminal is powered off against a user's desire, the mobile terminal operates as if it is powered off and sends information about the location thereof to the sever of a mobile communication service provider.

Technical Solution

In order to accomplish the above object, the present invention provides a disguised power-off method for a mobile terminal, including the steps of detecting input for actually powering off a subscriber terminal or powering off a subscriber terminal in a disguised manner through key input means; if the subscriber terminal has been powered off in a disguised manner, switching the subscriber terminal to a disguised power-off mode; allowing the subscriber terminal to determine whether a location signal has been requested by a server of a mobile communication service provider in a disguised power-off mode; if it is determined that the location signal has been requested by the server of the mobile communication service provider, transmitting a location signal of the subscriber terminal to the server of the mobile communication service provider; determining whether a power-on key has been pressed through the key input means of the subscriber terminal; and maintaining the disguised power-off mode, or switching the subscriber terminal to a normal mode depending on the input of the power-on key and registering communication service with the server of the mobile communication service provider.

Furthermore, the disguised power-off method further includes the steps of determining whether an incoming call signal has been received after the subscriber terminal has been switched to the disguised power-off mode; and if, as a result of the determination, the incoming call signal has been received, generating a control signal to resume supply of power to the key input means.

Furthermore, the disguised power-off mode prevents reception of calls, sending of calls, shuts off display power and prevents the input and output of sound to and from the subscriber terminal.

Furthermore, the location signal of the subscriber terminal to the server of the mobile communication service provider.

Furthermore, the location signal is sent using a GPS.

Furthermore, the location signal is sent when information about an originator terminal that requests a call connection to the subscriber terminal, and specific terminal information, which is stored in the subscriber terminal, is identical to the originator terminal information.

Furthermore, the location signal is sent to the server of the mobile communication service provider at predetermined intervals.

Furthermore, the disguised power-off mode is switched when the power-off key of the subscriber terminal is pressed.

Furthermore, if the subscriber terminal is actually powered off, power of the subscriber terminal is completely cut off.

Furthermore, the real power-off of the subscriber terminal is achieved by simultaneously pressing the power-off key and a specific key, or sequentially pressing the power-off key and the specific key.

Advantageous Effects

As described above, in accordance with the present invention, the real power-off and disguised power-off of a mobile terminal are employed, so that, although the mobile terminal is powered off through the disguised power key of the terminal when a communication service subscriber, such as a child or teenager, is in danger, a signal indicating information about the location of the mobile terminal is sent to the server of a mobile communication service provider. Accordingly, there is an advantage in that the location of the mobile terminal of the subscriber can be determined.

Furthermore, there is an advantage in that a subscriber's personal security can be ensured using information about the location of a mobile terminal.

Furthermore, in the case where a subscriber loses his or her mobile terminal, if the person who picks up the lost mobile terminal powers off the terminal using the disguised power key of the mobile terminal, information about the location of the lost mobile terminal can be determined. Accordingly, there is an advantage in that the lost mobile terminal can be easily recovered.

BEST MODE

Figure 1:
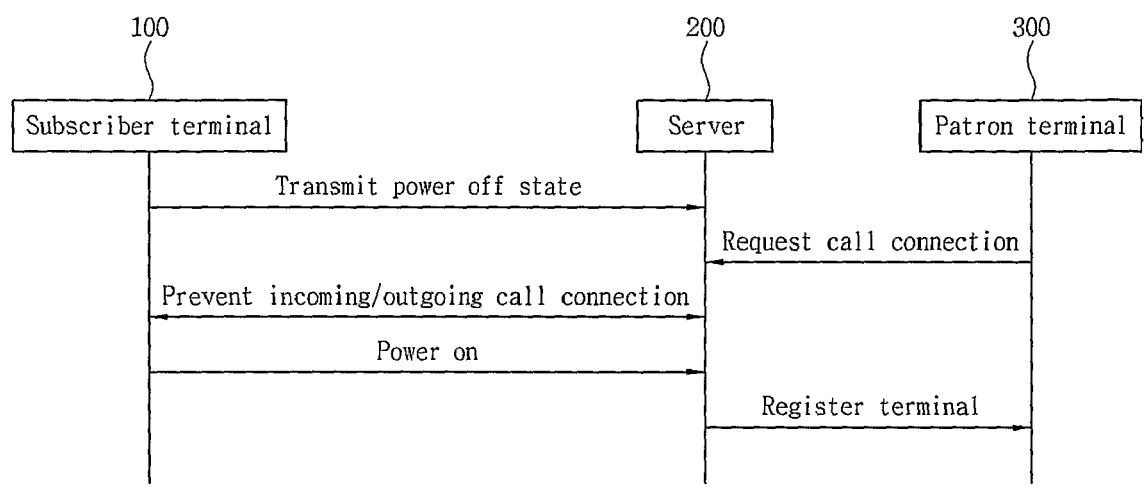
FIG. 1 is a conceptual view illustrating the on/off process of a common mobile terminal.

The present invention is described in detail in connection with preferred embodiments with reference to the accompanying drawings.

The same reference numerals are used to designate the same parts as in the conventional construction. Descriptions of redundant constructions are omitted. The subscriber terminal 100 detects power-on or power-off through the key input means. In the case of power-off, the subscriber terminal 100 determines whether power-off is real power-off or disguised power-off. If it is determined that power-off is real power-off, the subscriber terminal 100 sends a power-off signal to the server 200 of a mobile communication service provider.

Furthermore, if the key input is disguised power-off, the subscriber terminal 100 displays the power-off of the subscriber terminal 100 through the display means of the subscriber terminal 100 so as to look as if it is actually powered off.

Figure 2:
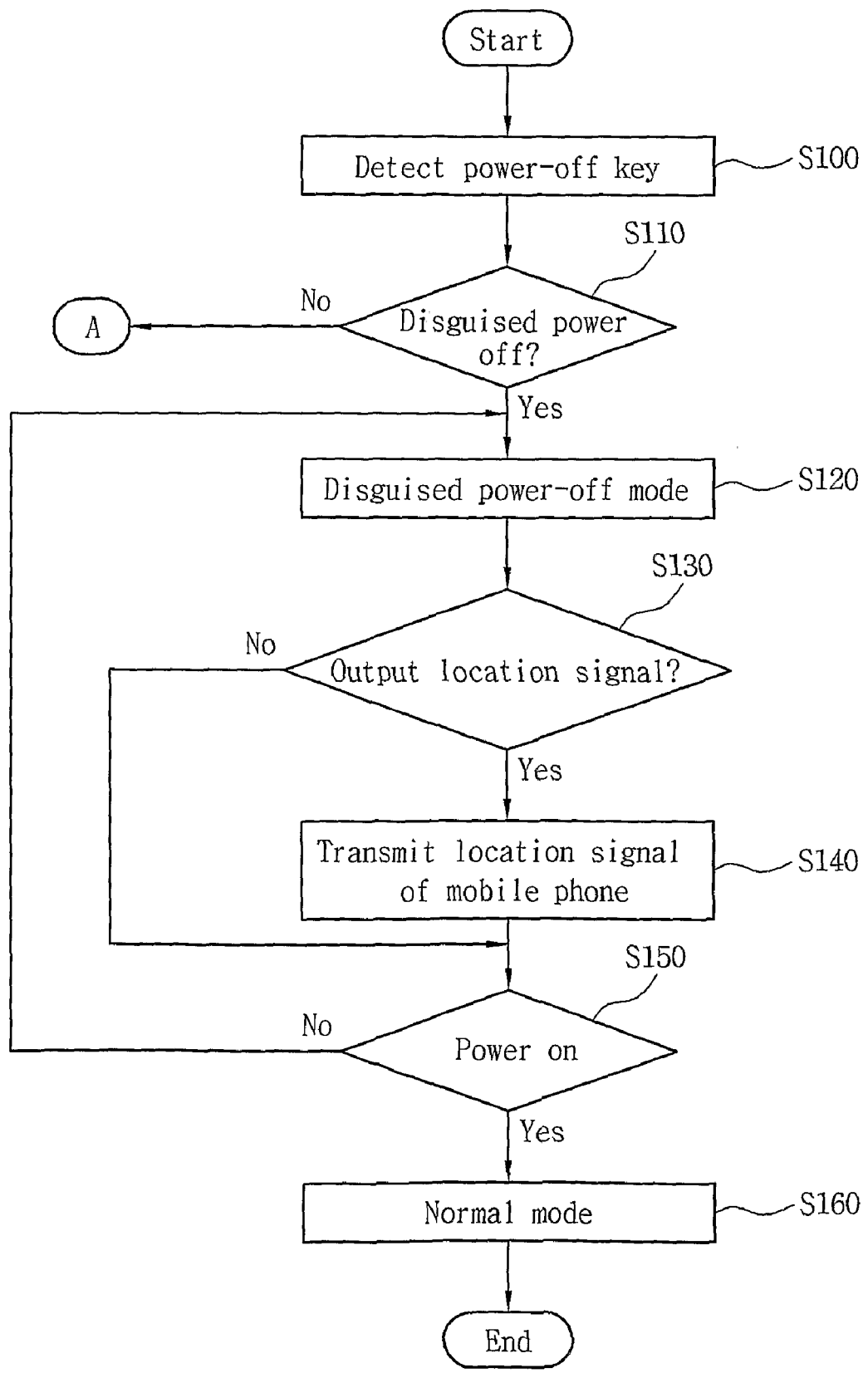
FIG. 2 is a flowchart illustrating the operational process of a mobile terminal for providing disguised power-off, in accordance with the present invention.
Figure 3:
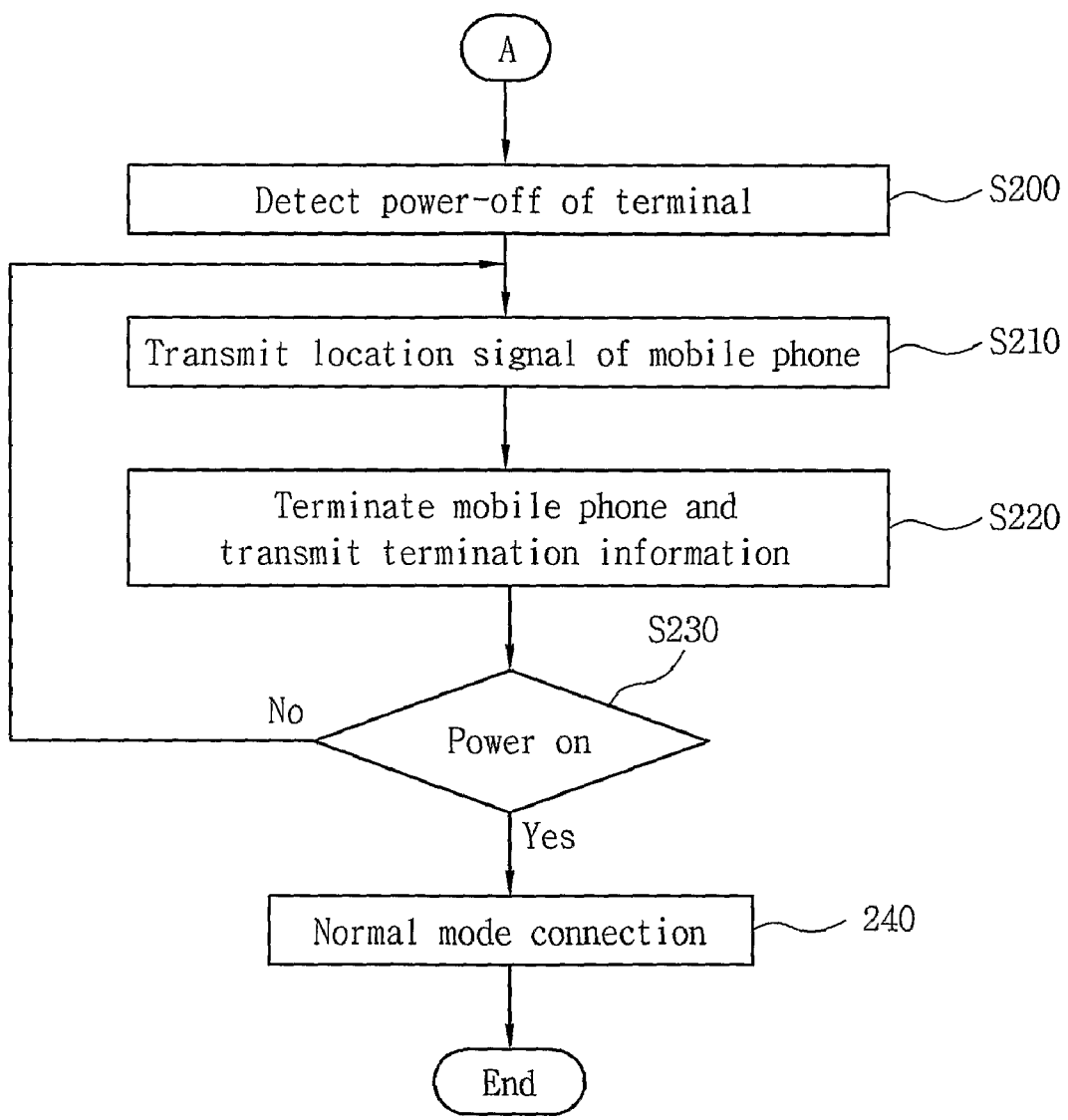
FIG. 3 is a flowchart illustrating the operational process of the mobile terminal for providing disguised power-off, which is shown in FIG. 2.

FIG. 2 is a flowchart illustrating the operational process of a mobile terminal for providing disguised power-off according to the present invention. FIG. 3 is a flowchart illustrating the operational process of a server system for providing disguised power-off according to the present invention. The processes are described in more detail with reference to FIGS. 2 and 3 below.

In FIGS. 2 and 3, the subscriber terminal 100 detects the manipulation of a power-off key through the key input means at step S100, and then determines whether the subscriber terminal 100 is actually powered off or powered off in a disguised manner at step S110. The real power-off and disguised power-off can be determined through the following key input. Real power-off is achieved by simultaneously pressing the generally used power-off key and a specific key through the key input means. For example, the power key and a volume key, the power key and a specific number key, or the power key and a # key may be pressed at the same time. The combination of the real power-off key and the specific key may be arbitrarily changed by a user. Furthermore, the disguised power-off is achieved by pressing only the generally used power-off key through the key input means.

If the disguised power-off key is detected at step S110, the subscriber terminal 100 switches the subscriber terminal 100 to a disguised power-off mode at step S120. At step S120, the disguised power-off mode allows the subscriber terminal 100 to operate as if it is powered off by cutting off power supply to the transmission/reception means for driving functions necessary for sending and receiving calls and blocking input and output to and from the display means and the sound I/O means for providing an interface between the subscriber and the subscriber terminal 100. At this time, the subscriber terminal 100 sends a signal indicating the location of the terminal to the server 200 of the mobile communication service provider in order to allow the server 200 to know a current location. The confirmation signal can be a confirmation signal for maintaining communication with a base station (not shown) or a location signal using the GPS, but is preferably the confirmation signal using the GPS.

Furthermore, the subscriber terminal 100 determines whether an incoming call signal is received after it has been switched to a disguised power-off mode. If it is determined that the incoming call signal is received, the subscriber terminal 100 can generate a control signal to resume the supply of power to the key input means.

After step S120 has been performed, the subscriber terminal 100 determines whether a location request signal has been sent by the server 200 of the mobile communication service provider in a disguised power-off mode at step S130. That is, if the location of the subscriber terminal 100 that has been powered off in a disguised manner has been requested by the patron terminal 300, the server 200 of the mobile communication service provider requests a location signal from the subscriber terminal 100 by sending a location request signal to the subscriber terminal 100. The patron terminal 300 is a terminal that has been previously set in the server 200 of the mobile communication service provider so that the location of the subscriber terminal 100 can be determined.

If sending of the location signal of the subscriber terminal 100 has been requested by the server 200 of the mobile communication service provider at step S130, the subscriber terminal 100 sends the location signal to the server 200 of the mobile communication service provider at step S140. Furthermore, step S130 can include the step of allowing the subscriber terminal 100 to periodically send the location signal to the server 200 of the mobile communication service provider at predetermined intervals although the location request signal is not received from the server 200 of the mobile communication service provider.

Meanwhile, if the location signal of the subscriber terminal 100 has been requested by the server 200 of the mobile communication service provider at step S130, the subscriber terminal 100 can transmit the location signal of the subscriber terminal 100 to the server 200 of the mobile communication service provider and can be connected to the terminal of a particular call originator through an automatic connection, depending on whether call originator information based on originator information display and particular information stored in the subscriber terminal 100 are identical to each other.

After step S140 has been performed, the subscriber terminal 100 determines whether a key has been pressed through the key input means (not shown) and thus determines whether a pressed key is the power-on key of the terminal at step S150. If it is determined that the power-on key has not been pressed, the process returns to step S120.

Otherwise, if the power-on key has been pressed at step S150, the subscriber terminal 100 is supplied with power and thus operates normally at step S160. Furthermore, if the power-on key of the subscriber terminal 100 has been pressed at step S160, the server 200 of the mobile communication service provider registers communication service of the subscriber terminal 100 as normal and achieves a connection to the subscriber terminal 100.

Furthermore, if the location signal of the subscriber terminal 100 has not been requested by the server 200 of the mobile communication service provider at step S130, the subscriber terminal 100 proceeds to step S150 where it determines whether the power-on key has been pressed through the key input means of the subscriber terminal 100.

Meanwhile, at step S110, if it is determined that the real power-off key has been pressed through the key input means at step S200, the control means (not shown) of the subscriber terminal 100 sends information indicating the current location of the terminal 100 through the transmission/reception means of the terminal to the server 200 of the mobile communication service provider at step S210.

After step S210 has been performed, the subscriber terminal 100 performs a process of terminating real power. The server 200 of the mobile communication service provider stores information on the real power-off of the subscriber terminal 100 at step S220.

After step S220 has been performed, the control means of the subscriber terminal 100 determines whether a key has been pressed through the key input means and determines whether the pressed key is the power-on key of the terminal at step S230. If it is determined that the power-on key has not been pressed, the control means returns to step S210.

Meanwhile, if the power-on key has been pressed at step S230, the subscriber terminal 100 is supplied with power and thus operates normally at step S240. Furthermore, if the power-on key of the subscriber terminal 100 has been pressed at step S240, the server 200 of the mobile communication service provider registers communication service of the subscriber terminal 100 as normal and achieves a connection to the subscriber terminal 100.

Industrial Applicability

As described above, the subscriber terminal 100 operates as if it is actually powered off if the disguised power-off key, not the real power-off key, is pressed, and can be normally provided with communication service from the server 200 of the mobile communication service provider if the power-on key is pressed.

Furthermore, in the case where the patron terminal 300 requests information about the location of the subscriber terminal 100 that has been powered off in a disguised manner through the server 200 of the mobile communication service provider, the subscriber terminal 100 can transmit a signal indicating its current location to the server 200 of the mobile communication service provider, while maintaining a state of being actually powered off. Accordingly, the patron terminal 300 can determine the current location of the subscriber terminal 100.

The present invention has been described with reference to the particular preferred embodiments above. However, the present invention is not limited to the embodiments. Those skilled in the art can change or modify the embodiments without departing from the scope and spirit of the present invention.

The invention claimed is:

1. A disguised power-off method for a mobile terminal, comprising the steps of:
    receiving an input requesting that a subscriber terminal enter a disguised power-off mode, the input being generated through key input means;
    sending a location signal indicating a location of the subscriber terminal to a server of a mobile communication service provider, and switching the subscriber terminal to the disguised power-off mode;
    receiving an incoming call signal after the subscriber terminal has been switched to the disguised power-off mode;
    generating a control signal to resume supply of power to the key input means in the disguised power-off mode after receiving the incoming call signal;
    receiving a location request signal from the mobile communication service provider in the disguised power-off mode;
    transmitting the location signal to the mobile communication service provider in the disguised power-off mode;
    receiving an input requesting that the subscriber terminal be powered on, the input being generated through the key input means of the subscriber terminal in the disguised power-off mode; and
    switching the subscriber terminal from the disguised power-off mode to a normal mode and registering communication service with the server of the mobile communication service provider, wherein, after receiving the incoming call signal, the subscriber terminal maintains the disguised power-off mode until the input requesting that the subscriber terminal be powered on is received, wherein the disguised power-off mode shuts off display power and prevents input and output of sound to and from the subscriber terminal, and wherein the location signal is sent when information about an originator terminal that requests a call connection to the subscriber terminal is identical to specific terminal information stored in the subscriber terminal.

2. The disguised power-off method according to claim 1, wherein a location of the subscriber terminal is determined using a Global Positioning System (GPS).

3. The disguised power-off method according to claim 1, wherein the location signal is sent to the mobile communication service provider at predetermined intervals.

4. The disguised power-off method according to claim 1, wherein the input requesting that the subscriber terminal enter the disguised power-off mode is generated when a power-off key of the subscriber terminal is pressed.

5. The disguised power-off method according to claim 1, further comprising:

receiving a signal requesting that the subscriber terminal is completely powered off; and completely cutting off the power of the subscriber terminal.

6. The disguised power-off method according to claim 5, wherein the signal requesting that the subscriber terminal be completely powered off is generated by simultaneously pressing a power-off key and a specific key, or sequentially pressing the power-off key and the specific key.

7. The disguised power-off method according to claim 6, wherein the input requesting that the subscriber terminal enter the disguised power-off mode is generated by pressing the power-off key.

8. The disguised power-off method according to claim 1, wherein the mobile communication service provider requests the location signal in the disguised power-off mode when a location of the subscriber terminal has been requested by a patron terminal.

9. The disguised power-off method according to claim 1, wherein the subscriber terminal is connected to a terminal of call originator, depending on whether call originator information based on originator information display and information stored in the subscriber terminal are identical to each other.

* * * * *